Inventor
M. DEN HERTOG-
C. DE ZEEUW
By Robert Harding Jr.
Attorney

Nov. 17, 1959 M. DEN HERTOG ET AL 2,913,528

SCANNING CIRCUIT

Filed April 9, 1953 4 Sheets-Sheet 2

Inventor
M. DEN HERTOG-
C. DE ZEEUW

By Robert Harding Jr.
Attorney

Nov. 17, 1959 M. DEN HERTOG ET AL 2,913,528

SCANNING CIRCUIT

Filed April 9, 1953 4 Sheets-Sheet 3

Inventor
M. DEN HERTOG-
C. DE ZEEUW
By Robert Harding Jr.
Attorney

| TU | a | b | c | N |
|---|---|---|---|---|
| 1 | 1 | 1 | 1 | 1 |
| 2 | 2 | 2 | 1 | 7 |
| 3 | 3 | 3 | 1 | 13 |
| 4 | 4 | 4 | 1 | 19 |
| 5 | 5 | 1 | 1 | 5 |
| 6 | 1 | 2 | 2 | 6 |
| 7 | 2 | 3 | 2 | 12 |
| 8 | 3 | 4 | 2 | 18 |
| 9 | 4 | 1 | 2 | 4 |
| 10 | 5 | 2 | 2 | 10 |
| 11 | 1 | 3 | 3 | 11 |
| 12 | 2 | 4 | 3 | 17 |
| 13 | 3 | 1 | 3 | 3 |
| 14 | 4 | 2 | 3 | 9 |
| 15 | 5 | 3 | 3 | 15 |
| 16 | 1 | 4 | 4 | 16 |
| 17 | 2 | 1 | 4 | 2 |
| 18 | 3 | 2 | 4 | 8 |
| 19 | 4 | 3 | 4 | 14 |
| 20 | 5 | 4 | 4 | 20 |
| 21 | 1 | 1 | 5 | 1 |
| 22 | 2 | 2 | 5 | 7 |
| 23 | 3 | 3 | 5 | 13 |
| 26 | 1 | 2 | 1 | 6 |
| 100 | 5 | 4 | 5 | 20 |

Fig.4.

Inventor
M. DEN HERTOG
C. DE ZEEUW
By Robert Harding Jr.
Attorney

United States Patent Office 2,913,528
Patented Nov. 17, 1959

2,913,528

SCANNING CIRCUIT

Martinus den Hertog and Constantinus De Zeeuw, Antwerp, Belgium, assignors to International Standard Electric Corporation, New York, N.Y., a corporation of Delaware Application April 9, 1953, Serial No. 347,766

Claims priority, application Netherlands April 25, 1952

4 Claims. (Cl. 179—15)

This invention relates to electrical pulse time scanning equipment.

It is known to utilize electrical pulses in different positions of a recurrent time cycle to carry different items of information.

It is also known to utilize pulse time comparators to determine whether a pulse occurs in a particular time position, or to determine either whether a pulse of a predetermined one of a plurality of different possible electrical values or characteristics occurs in a particular time position, or when such a pulse occurs.

Up till now it has been the practice when the pulse cycle is in continuous operation to begin inspection of the pulse cycle at a random time position.

The main feature of the present invention is to provide means to enable inspection to begin at a predetermined time position in a cycle.

Another feature of the invention is to terminate inspection at a predetermined time position in a cycle.

The invention is illustrated in the accompanying drawings in which:

Figure 4 is a chart of time positions used for characterizing the terminals in the circuit of the invention.

Figure 1:
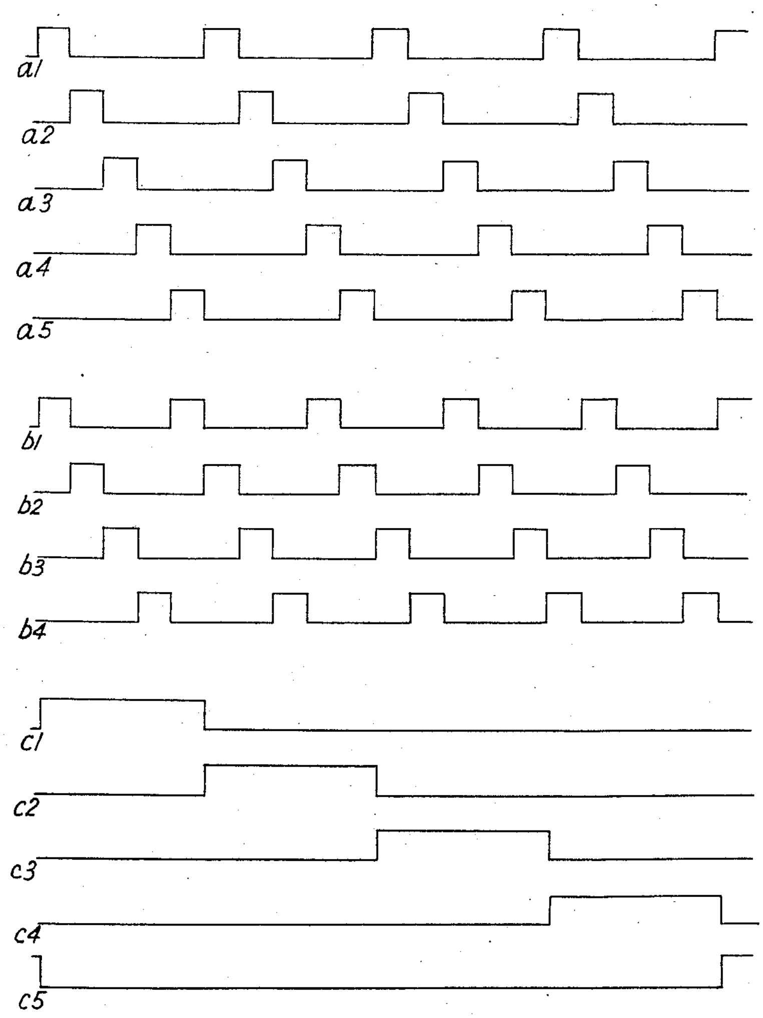
Figure 1 is a diagram of pulse wave forms used to control the circuits.

The invention will be described with reference to an electronic circuit for scanning on a time pulse basis a group of twenty positions each of which has an individual identity and also belongs to any one of five groups. For this purpose a time pulse cycle of one hundred positions is used, derived from three different sets of pulse sources which comprise—five, four and five sources, issuing pulse wave forms, with pulses in five, four and five consecutive time positions respectively, which are shown diagrammatically in Fig. 1.

The first, or *a* set of sources supply pulses of unit length, and comprise five different pulse sources, *a*1–*a*5 supplying pulses in five consecutive time positions respectively; that is, source *a*1 supplies pulses in time positions Nos. 1, 6, 11, . . ., source *a*2 supplies pulses in time positions Nos. 2, 7, 12, . . ., and so on.

The second or *b* sources supply pulses of unit length, but there are only four of them and the repetition rate is every fourth time position, so that the *b*1 source supplies pulses in time positions 1, 5, 9, . . ., the *b*2 source supplies pulses in time positions 2, 6, 10, . . ., and so on.

The third, or *c* sources supply pulses each equal in length to five *a*, or unit time intervals TU, and there are five sources.

The first of the four sources, *c*1, supplies a pulse *c* during time positions Nos. 1–5, and again during time positions 26–30, 51–55, . . ., the second source *c*2 supplies a pulse during time positions 6–10, and again during time positions Nos. 31–35, 56–60, . . ., and so on.

Figure 2:
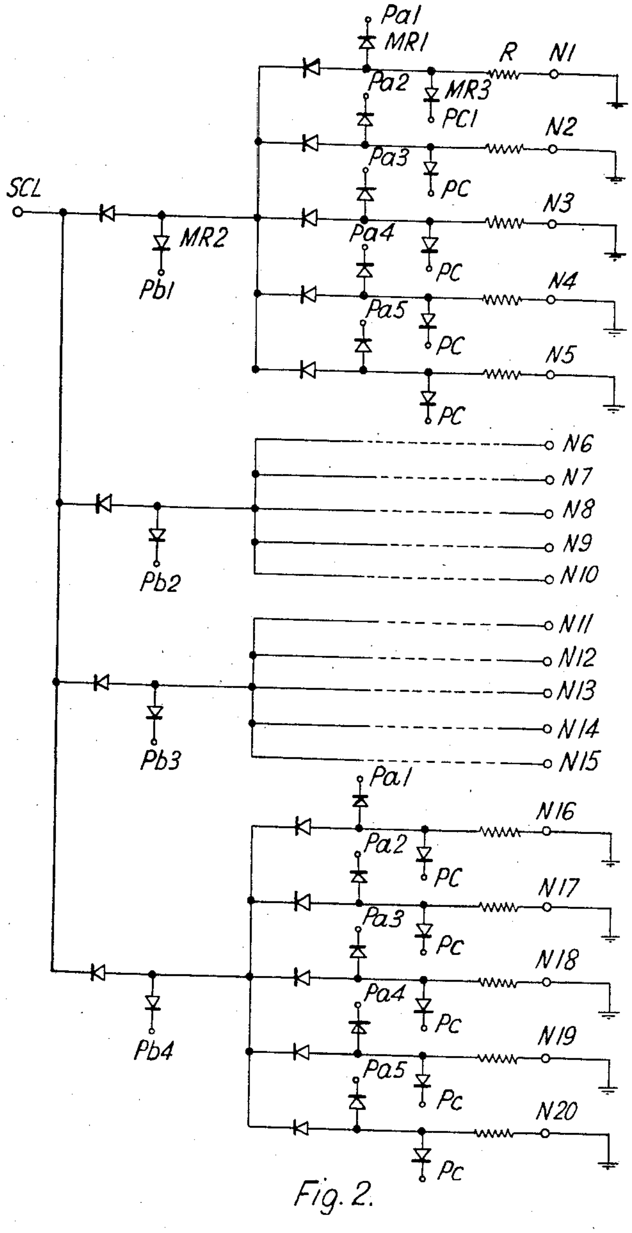
Figure 2 is a pulse-time scanning circuit used in connection with the invention.

A pulse-time scanning circuit, as shown in Fig. 2, is used for scanning the twenty terminals N1–20, pulses passing to the lead SCL from terminals N1–20 in the time positions shown in the chart on Fig. 4. It will be seen that pulse sources *a* and *b* by themselves adequately define a separate time position or time unit interval TU for each terminal N1–20 in twenty consecutive unit time positions. As shown in Fig. 2, the terminals have been divided into four groups of five terminals each, using time pulses $b_{1/4}$ to characterize the groups, and pulses $a_{1/5}$ to characterize the individual terminals within each group. Alternatively five groups of four single terminals can be obtained by applying each of the five *a* time pulses to the common gates of five groups of four leads each, members of each such group being characterized by four different *b* pulses. In either case, a different grouping of individual leads, arbitrarily selected, may be obtained by using pulses of sources $c_{1/5}$, to assign each individual terminal to one of 5 groups. This may be realized by applying the group identification pulses to the individual leads of the twenty terminals through rectifiers such as MR3.

The scanning circuit of Fig. 2 is a gating network of the type described in the application of Wily Pouliart et al., Serial No. 167,752, filed June 13, 1950 (now Patent No. 2,724,018). It will be seen that it is a tree circuit having 20 terminals N1–20 to be scanned which are multipled in groups of 5 to four leads which are themselves multipled to the common point SCL. Each terminal is effectively connected to the common point SCL when all branch rectifiers connected to the connection from that terminal to SCL are biassed to their high resistance condition. Thus terminal 1 is connected to SCL when MR1, MR2 and MR3 are simultaneously biassed to their high resistance conditions.

The pulse source controlling this scanning circuit have as their "no-pulse" level −40 volts, this being the relatively negative voltage, and as their "pulse" level −16 volts, this being the relatively positive voltage. From the above it will be seen that when the P*a*1 pulse matures, i.e. when its voltage becomes −16 volts, at the same time as P*b*1 and P*c*1 matures, there will be a pulse at SCL in the time position P*a*1, P*b*1, P*c*1. This identifies terminal No. 1, by P*a*1, P*b*1, and its group allocation by P*c*1.

It will be seen from the chart in Fig. 4 that within the complete cycle of 100 time positions the particular combination of *a* and *b* pulses for any one terminal appears 5 times, each time associated with a different one of the *c*-pulse sources. If therefore a terminal is characterized by a certain one of these *c*-pulse sources, there will be within the complete cycle of 100 time units, only one output pulse corresponding to said terminal, which also corresponds to the chosen *c*-pulse source.

The way in which terminals may be allocated to the groups characterized by *c*-pulse sources is completely arbitrary, i.e. each terminal may be allocated to any group, simply by connecting the *c*-source corresponding to the chosen group to the P*c*-terminal associated with said terminal.

In an analogous manner scanning circuits using different pulse schemes may be provided in case of larger assemblies of terminals or different groups, or both. For example, for an assembly of up to 110 lines the *a* cycle may comprise 10 sources, and the *b* cycle may comprise 11 sources. The cycle which is used for group indication must comprise at least as many sources as there are groups to be distinguished.

It may include one series of pulse sources like the P*c* sources or more. The essential point is that a number of characteristic time intervals equal to the product of the number of lines by the number of characteristic condition or the number of groups in which each of said lines may be should be defined by one or more of the pulse sources, e.g. P*a*/P*b*, characterizing a particular line and by one or more of the pulse sources, e.g. P*c*, characterizing the group in which said line may be. In this connection, reference is made to U.S. Patent No. 2,677,540, issued January 26, 1954.

The terminals are all shown as being earthed via resistances such as R, the connection to earth acting as a source of positive voltage for the circuit. If the circuit were used in a group selector in a telecommunication exchange, means would be provided, as in U.S. Patent No. 2,677,540, for removing the earth potential, or for replacing it by a relatively negative potential if the outlet corresponding to that terminal were busy. Hence the pulses at SCL would then represent free outlets. The present invention is, of course, not restricted to such systems.

Figure 3:
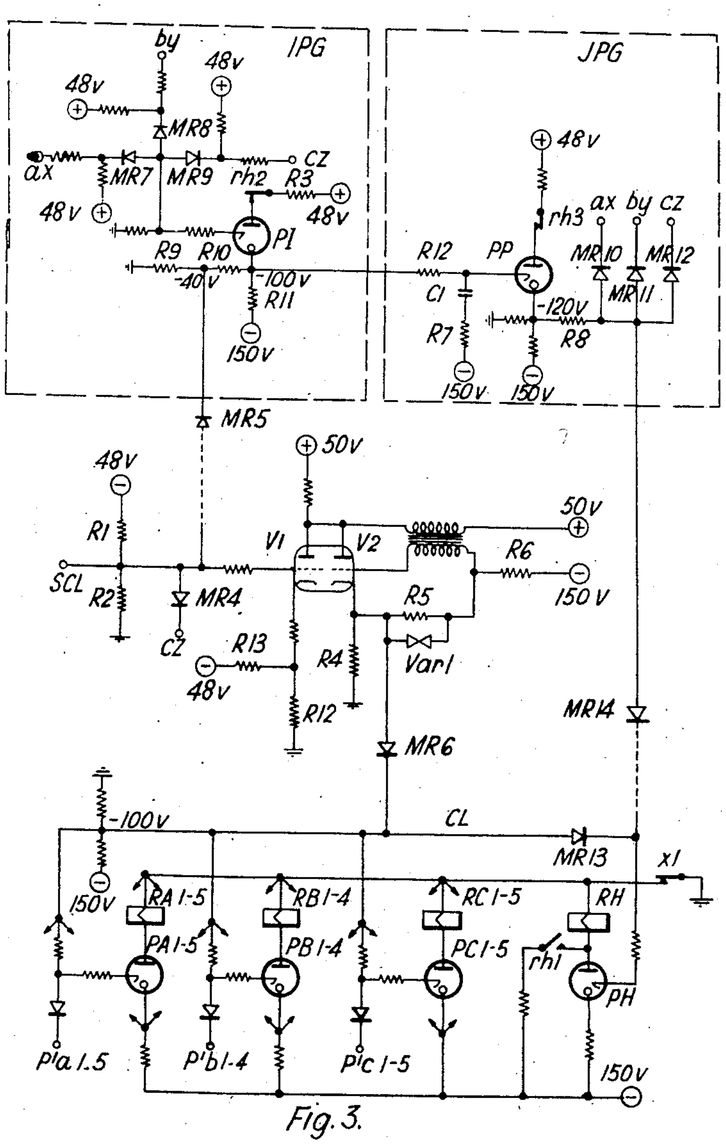
Figure 3 is a circuit diagram of a comparator and an electronic register used with the invention.

To examine or select all terminals belonging to any one group i.e. to perform group testing or selection, the lead SCL is connected to an electronic pulse time comparator which is so biased that it will only respond to pulses occurring during the *c* pulse allocated to the required group, e.g. *c*1. Fig. 3 shows a comparator, which has previously been described in the above mentioned U.S. patent.

The lead SCL is connected to the grid of the left-hand triode V1 of the double triode V1—V2. The grid of the triode V1 is also connected to the junction between R1 and R2, R1 being of 240,000 ohms and R2 of 1,200,000 ohms, so that the potential divider so formed normally holds the grid of V1 at −40 volts. The cathode of V1 is at −16 volts, derived from a potential divider, R13 and R12, the first of 3200 and the second of 1600 ohms, so that the tube is cut off in the absence of any pulse input. The grid of V1 is also controlled by a rectifier gate connection via rectifier MR4 to a *c* pulse source. This will be further described later. The grid of V1 can also be controlled by a gate circuit IPG, via a rectifier MR5; this also will be described later. When IPG is used, circuit JPG is also used.

The second triode V2 of the double triode is connected as a blocking oscillator and is arranged to operate when triggered by a negative impulse applied to its anode. The cathode output of V2 is fed via a decoupling rectifier MR6 to an electronic register consisting of cold-cathode gaseous discharge tubes PA1–5, PB1–4 and PC1–5, whose trigger electrodes are connected in parallel to the common lead CL, to which MR6 is connected. The individual leads to the trigger electrodes of these tubes are each controlled by a pulse source, PA1–5 being controlled by the sources *a*1–5 respectively, PB1–4 by *b*1–4 respectively and PC1–5 by *c*1–5 respectively. The tube PH is controlled solely by the pulse, if any, on CL. The cathodes of all these gas tubes are connected via resistances to −150 volts, the connections being common for the groups of gate controlled tubes, as shown. This ensures that only one tube in each batch of gate controlled tubes can be lit at any one time. All of these tubes have their anodes connected to earth via relay windings; PH via relay RH, PA1–5 via relays RA1–5, respectively, PB1–4 via RB1–4, respectively, and PC1–5 via RC1–5, respectively. The anodes are connected to earth via a common lead and a contact *x*1 of relay X (not shown), which contact is closed when the circuit is in use.

The pulse sources used to control the tubes of the electron recorder are the same as those used to control the scanner of Fig. 2 except that their "no pulse" level is −100 volts and their "pulse" level is −50 volts. A gate controlled tube can only fire when the pulse source connected to its trigger electrode is delivering a pulse, i.e. when its output is −50 volts, and a pulse is simultaneously present on CL.

It will be assumed first that the grid of V1 is connected via MR4 to a *c* pulse source, but that circuit IPG is not connected. When the circuit is to be used, MR4 will be connected to a *c* pulse source, shown as *cz* corresponding to any desired one of *c*1 to *c*5. When a pulse *cz* matures, i.e. reaches the value of −16 volts, and if a pulse of a similar value simultaneously appears on SCL, the voltage on the grid of V1 will rise from −40 volts as set by the potentiometer R1—R2 to, say −16 volts. This brings the grid and cathode of V1 to the same value, so V1 conducts for the duration of the coincidence, i.e. as long as the pulse due to the terminal of the desired group lasts. Hence the anode output of V1 is a negative going pulse which triggers the blocking oscillator V2. V2, in a well-known manner, generates a positive going pulse of fixed duration, the blocking oscillator being adjusted so that the generated pulse is contained within the limits of one time unit TU, which pulse is applied to the electronic recorder. The circuit of V2 includes a varistor Var 1 which ensures that this pulse is of constant size and shape.

Thus the comparator is only operable during the pulses *cz*, which thus define the time positions, in which pulses may be detected within the overall pulse cycle.

A further control can be applied to the grid of VI to determine the starting point of the operation of the comparator. This is the gate circuit IPG, connected to the grid of V1 via MR5. The control potential for MR5 is obtained from the cathode of a cold-cathode tube PI, whose anode is connected to +48 volts via a back contact *rh*2 of relay RH and a small resistance R3. Its cathode is connected to the junction between resistors R10 and R11, which is normally at about −100 volts. These resistors form, together with resistor R9, a voltage divider between ground and −150 volts, and MR5 is connected to the junction between R9 and R10, which is normally at −40 volts. The trigger electrode of PI is controlled by three rectifier gates MR7, MR8, MR9. These gates are controlled respectively by an *a* pulse source, a *b* pulse source, and a *c* pulse source. The suffixes *x*, *y*, *z*, represent any desired time position in the cycle at which it is desired to commence operations. Only when the selected pulse sources *ax*, *by*, *cz* give simultaneous outputs does PI fire. When it does fire, the current flow through its cathode resistance raises the voltage applied to MR5 to approximately −16 volts. Thus MR5 is driven to its high resistance condition. At any time thereafter when MR4 is biassed by −16 volts from *cz*, i.e. during the *cz* pulses, a pulse on SCL can cause V1 to conduct and trigger V2, as has been described above.

Thus if a particular combination *ax*, *by*, *cz* is connected to MR7, MR8, MR9, respectively, PI is fired, and thereafter during any *cz* pulse (applied to MR4), a pulse applied to V1 grid, via SCL, will cause V1 to conduct. During the full 100 time unit cycle, the pulse *cz*, which is five time units long, recurs four times, and pulses identifying terminals of a group identified by *cz* can occur in any one of those four recurrences of *cz*. If a pulse occurs on SCL in any *cz* period during the 100 time units immediately following the firing of PI, V1 conducts and triggers V2. When V2 is quiescent, its cathode potential is held by a potential divider R4, R5, R6 at −100 volts, which potential cannot fire any tubes. The output from V2, as has been described, fires PH, and one each of PA1 to 5, PB1 to 4 and PC1 to 5. The anode relays of the tubes fired operate at the same time and the tubes and relays remain operated in series. In the case of selection or testing, these anode relays RA, RB, RC are used to control the circuits for rendering the selected terminal effective, or to indicate the identity of the selected terminal.

When RH operates, it locks at *rh*1, and at *rh*2 it extinguishes PI. This extinction of PI removes the −16 volts from MR5, so that the comparator is disabled. Thus the comparator was started at a predetermined time unit *ax, by, cz* and was disabled again after it responded to the first pulse received in a *cz* period.

If there is no pulse received in the desired *cz* periods it is desirable to disable the comparator after it has been operating for a full 100-unit cycle, i.e. at the next *ax, by, cz* time unit. To do this, tube PP and its controlling gates, in circuit JPG, are used. This tube is only used when the IPG gate is also used. When PI fired, the positive pulse, so produced at its cathode was applied to the trigger electrode of cold cathode tube PP. This potential was unable to fire PP immediately, since the trigger electrode of PP is connected via a series resistor R12, and shunted by a condenser C1 and resistance R7 to —150 volts. Before PP can fire, C1 must charge from the cathode of PI to a sufficient value. When this occurs, after a sufficient delay, PP fires and its cathode voltage becomes positive. This positive voltage is applied via R8 and MR14 to the trigger electrode of PH. However, PH cannot be fired over this circuit until the simultaneous occurrence of pulses *ax, by, cz,* when the rectifiers MR10, MR11 and MR12 are all biassed to their high resistance condition. At this point PH fires and operates its anode relay RH to disable the comparator in the same manner as has been described above. MR13 and MR14 are decoupling rectifiers.

If the gate IPG and the circuit JPG are not used, i.e. the only gate control on the grid of V1 is the *cz* pulse on MR4, the test for a pulse on lead SCL takes place during all *cz* pulses, subject to detection of a pulse on lead SCL coincident with any *cz* pulse.

With both gates MR4 and IPG provided (and using JPG), detection is initiated by operations occurring in the time unit characterized by *ax, by, cz,* takes place in successive *cz* time intervals, and if no detection takes place in the immediately succeeding 100-positions cycle, ends at the next time unit characterized by *ax, by, cz.* Alternatively, gate IPG (with JPG) could be provided alone, gate MR4 being omitted: testing would then take place for any pulse appearing on SCL at any moment within a complete 100-position cycle immediately following a pulse in the time position in which the gates MR7, MR8, MR9 are simultaneously closed and tube PI operates.

In this way, scanning within a recurrent time cycle can be accurately controlled by determination of the starting point and if desired the stopping point of a scanning operation.

In either of the above cases, when the circuit is to be cleared for a further operation, the relay X (not shown) functions to open its contact *x*1. This de-energizes such tubes as are fired, PH always being fired and a selection of one each from PA, PB, PC being fired when a selection has occurred. This releases all relays as well as all tubes. When the circuit is to be used again, X closes *x*1 and the circuit is ready for use.

While the principles of the invention have been described above in connection with specific apparatus, it is to be clearly understood that this description is made only by way of example and not as a limitation on the scope of the invention.

We claim:

1. A scanning circuit comprising a plurality of inputs, a common output, circuits connecting said inputs and output, pulse means connected to said circuits for producing a sequence of pulses at said common output, each pulse representing a different one of said inputs, registering means connected to said common output responsive to the receipt of a pulse from said output for registering the identity of the input represented by said received pulse, and a gating circuit independent of the pulses received at said common output and controlled by said pulse means for enabling said registering means for a predetermined period of time and at a selected time corresponding to the time position of a pulse representing any input.

2. A scanning circuit, as defined in claim 1, in which the enabling means includes a delay device and means for controlling the duration of the enabling period by said delay device.

3. A scanning circuit comprising a plurality of inputs arranged in groups, a common output, a tree-formation circuit leaving a common terminal for each group of inputs and connections from the inputs of each group to the associated common terminal and connections between said common terminals and said common output, a plurality of series of pulse sources, each source of the same series having the same pulse period and the same period of recurrence, the latter being a multiple of the former, the pulse intervals of the various sources from the same series being staggered by multiples of said pulse intervals, gating means for applying the pulses of one series respectively to the connections from the inputs of each group to the associated common terminals, and for applying the pulses of another series respectively to the connections from the common terminals to said common output, whereby a sequence of pulses appear at said output, each pulse representing a different one of said inputs, registering means connected to said common output responsive to the receipt of a pulse for registering the identity of the input represented by said received pulse, means independent of the pulses appearing at the output for enabling said registering means, means for applying a selected pulse from each series of sources to said enabling means, and means for initiating the operation of said enabling means only when coincidence occurs between said applied pulses.

4. A scanning circuit, as claimed in claim 3, in which said enabling means includes a delay device, and means controlled by said delay device for maintaining the operation of said enabling device for a period of time including a complete cycle of pulses representing said inputs.

References Cited in the file of this patent

UNITED STATES PATENTS

| | | |
|---|---|---|
| 2,549,422 | Carbrey | Apr. 17, 1951 |
| 2,623,108 | Holden | Dec. 23, 1952 |
| 2,724,018 | Pouliart et al. | Nov. 15, 1955 |
| 2,727,094 | Flowers et al. | Dec. 13, 1955 |
| 2,736,773 | Levy | Feb. 28, 1956 |